United States Patent [19]

Frungel

[11] 4,044,258

[45] Aug. 23, 1977

[54] NUCLEAR EXPLOSION DETECTOR WITH FALSE ALARM PREVENTION

[76] Inventor: Frank Frungel, Herwigredder 105a, 2 Hamburg 56, Germany

[21] Appl. No.: 415,617

[22] Filed: Nov. 14, 1973

Related U.S. Application Data

[63] Continuation-in-part of Ser. No. 212,429, Dec. 27, 1971, abandoned.

[30] Foreign Application Priority Data

Dec. 30, 1970 Germany ............................ 2064406

[51] Int. Cl.[2] .......................... G01J 1/00; G01T 1/00

[52] U.S. Cl. ....................................... 250/336; 324/72

[58] Field of Search ............................... 250/336, 338; 340/248 R; 324/72

[56] References Cited

U.S. PATENT DOCUMENTS

| | | | |
|---|---|---|---|
| 3,254,219 | 5/1966 | Finlay et al. | 250/338 |
| 3,467,826 | 9/1969 | Cotterman | 250/336 |
| 3,524,984 | 8/1970 | Fothergill et al. | 250/336 |

*Primary Examiner*—Alfred E. Smith
*Assistant Examiner*—David K. Moore
*Attorney, Agent, or Firm*—Michael J. Striker

[57] ABSTRACT

An antenna receives electromagnetic radiation and furnishes a corresponding signal which after differentiation sets a first monostable multivibrator whose output lasts for several microseconds. A photodiode receives light signals. If the light signals are received within the time that the first monostable multivibrator is set, the generation of an alarm is inhibited, since substantially simultaneous reception of electromagnetic and light signals indicates either atmospheric disturbance or conventional weapons. In the absence of an inhibit signal, a second multivibrator is set for several milliseconds at the end of the setting of the first multivibrator. Any light received while the second multivibrator is set results in the furnishing of an alarm.

9 Claims, 4 Drawing Figures

NUCLEAR EXPLOSION DETECTOR WITH FALSE ALARM PREVENTION

CROSS-REFERENCE TO RELATED APPLICATIONS

This application is a continuation in part of application Ser. No. 212,429, filed Dec. 27, 1971 and now abandoned.

BACKGROUND OF THE INVENTION

Detectors for nuclear explosions play an important role in the framework of civilian population protection. It is known, for example, that the extreme light intensities from a nuclear explosion can be very damaging to the eyes. For this reason, for example bunker telescopes which have closing devices and are utilized to observe nuclear explosions, are advantageously moved to their light blocking position once the nuclear explosion commences to generate light signals. The failure to protect an individual's eyes against the light from a nuclear explosion may not only result in great damage to his eyes but may even cause blindness. To prevent this possibility, it is preferred that, where possible, such reception of light by personnel is automatically and reliably controlled.

Detectors are known in the prior art for detecting nuclear explosions. However, the prior art detectors have suffered from certain disadvantages. First, such detectors have not been able to distinguish between nuclear explosions and lightning during severe lightening storms. Second, such prior art detectors have not been useful to distinguish between nuclear explosions and explosions of conventional ammunition of the chemical type. For these reasons, such detectors have frequently generated false alarms and have otherwise been unreliable. Reliable operation, without the generation of false alarms, is also important within the framework of international supervision of nuclear explosions under international treaties.

SUMMARY OF THE INVENTION

It is therefore an object of the present invention to provide an apparatus for detecting nuclear explosions which does not have the disadvantages in the prior art.

It is another object of the present invention to provide an apparatus for detecting nuclear explosions which is of simple construction and economical to manufacture.

It is, more specifically, an object of the present invention to provide an apparatus for detecting nuclear explosions which can distinguish between such explosions and lightning so as not to cause false alarms by the occurrence of the latter.

It is a further object of the present invention to provide an apparatus for detecting nuclear explosion which can distinguish between the latter and conventional chemical explosions so as not to cause false alarms by the occurrence of the latter.

According to the invention, an apparatus for detecting nuclear explosions is provided. Nuclear explosions first produce electromagnetic signals outside the visible range and secondly produce light signals within a predetermined maximum time delay following said electromagnetic signals. This maximum time delay is in the order of several milliseconds. Lightning storms and conventional weapons generate electromagnetic signals and subsequent light signals similar to those produced by a nuclear explosion, but spaced at the most several microseconds apart.

The present invention comprises first receiving means for receiving said electromagnetic signals outside the visible range and furnishing corresponding received electromagnetic signals. It further comprises second receiving means for receiving said light signals and furnishing corresponding received light signals. Monitoring means are provided which have a first input connected to said first receiving means, a second input connected to said second receiving means and a monitoring output for furnishing an alarm signal in response to a received light signal following a received electromagnetic signal by a determined time delay exceeding a predetermined minimum time delay indicative of occurrences other than nuclear explosions, but within said predetermined maximum time delay.

According to a preferred embodiment of the present invention, the monitoring means comprises coincidence means for furnishing a control signal only when no light signal is received within said predetermined minimum time delay of the reception of an electromagnetic signal. The control signal commences following the minimum time delay mentioned above and lasts until the end of said predetermined maximum time delay.

In a preferred embodiment of the present invention, the above-mentioned control signal is applied as one input to a gate whose other input is connected to the output of said second receiving means. The gate, in the preferred embodiment of the present invention, is an AND-gate and thus furnishes an output only when a light signal occurs within the determined time delay following receipt of an electromagnetic signal. The output of said AND-gate thus constitutes said alarm signal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1A:
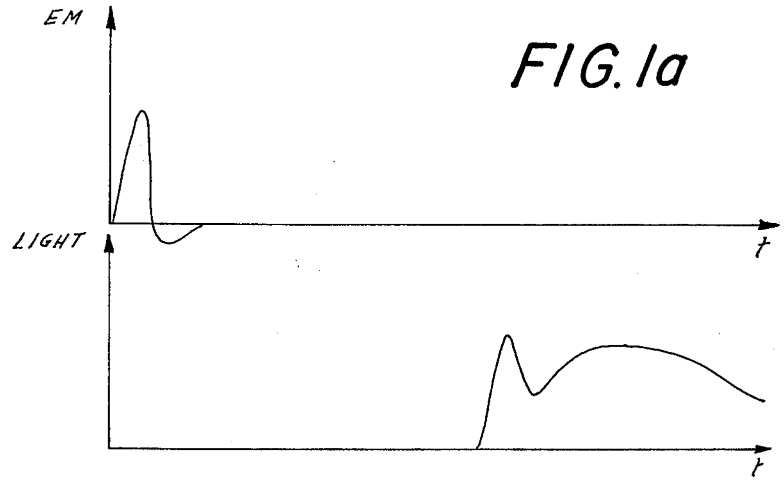
FIG. 1*a* shows graphically the time relationship of the signals resulting from a nuclear explosion.
Figure 1B:
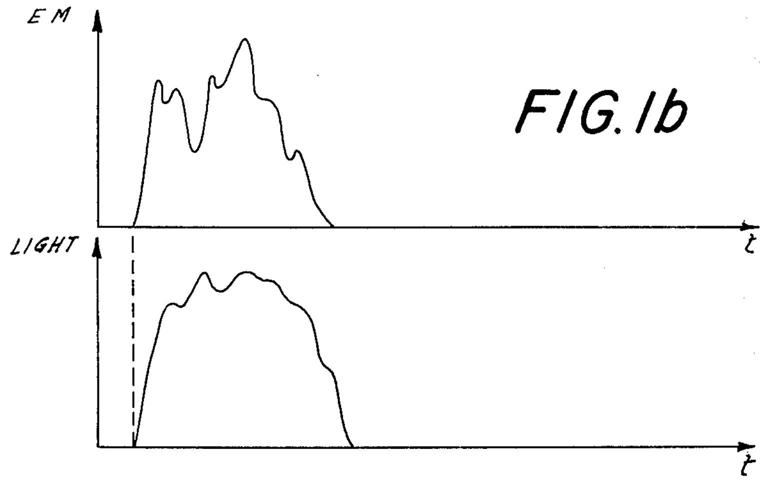
FIG. 1*b* shows the time relationship of the signals produced during lightening.
Figure 2:
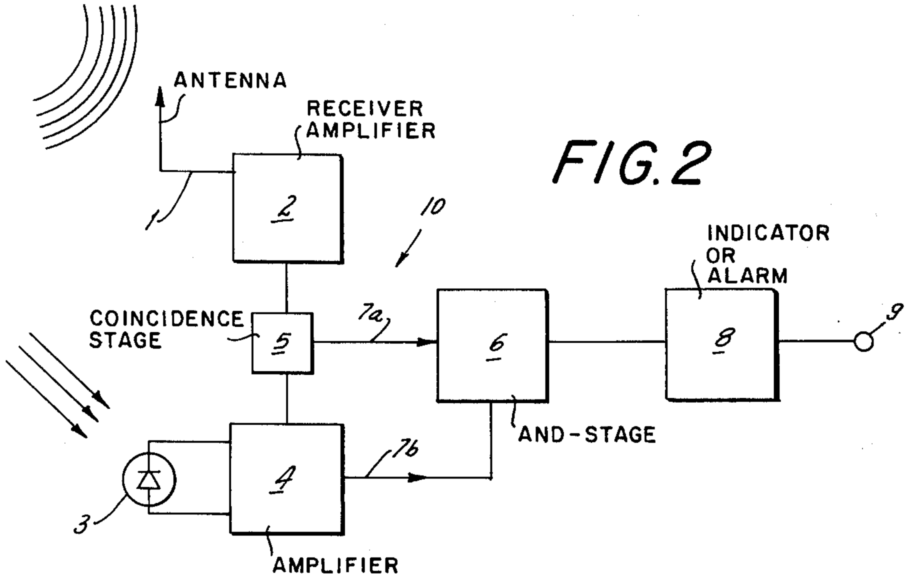
FIG. 2 is a block diagram of the detector according to the present invention.

Referring to FIG. 1*a*, two graphs are sketched of the signals which are generated during a nuclear explosion. The first graph shows the occurrence of the electromagnetic signal as a function of time while the second graph shows the light signal as a function of time. The time axes of the two graphs have been aligned so that the time delay between the occurrence of the electromagnetic signal and the light signal can be shown. Thus, in connection with nuclear explosions, the electromagnetic signals are generated before the explosion produces extreme intensities of light. Referring to FIG. 1*b*, similar graphical sketches are shown for the signals generated by lightning. During the lightening storms, the initial magnitudes of the electromagnetic signals as well as the light signals may be comparable to those generated by a nuclear explosion. For this reason, as suggested above, the prior art detectors have often caused false alarms. In fact, in addition to the large magnitudes of the electromagnetic signals generated by lightning, the light signals in both situations may not be unlike each other. This is true because the light signals generated by lightning may take many forms depending on the nature of the storm and the atmospheric conditions. Thus, it is not uncommon that the general form or magnitudes of the two signals in each case are very similar. However, the signals which are generated in a lightning storm usually have the property that the initial rises or slopes of both electromagnetic and light signal occur simultaneously. This is shown in FIG. 1*b* by the dash line normal to the time axis. Aside from this basic characteristic of lightning, lightning storms frequently generate a sequence of successive discharges wherein the time interval between the main lightning discharge and a secondary discharge that follows may be comparable to the corresponding time interval in nuclear explosions.

Explosions of the conventional type, that is chemical explosions, also can simulate signals as those shown in FIG. 1*a* for nuclear explosions. By detonating explosions, such as granades, electromagnetic radiation as well as light emission results. However, in the case of explosives, the relationship of the electromagnetic signals and the light signals can be distinguished from those for nuclear explosions as well as those for lightning discharges. In the case of detonation of explosives, the electromagnetic signal, although weak, is nevertheless detectable and occurs approximately a microsecond prior to the generation of the light signal. Such electromagnetic signals are probably generated by reason of the high ionization gradient of the detonation product. In order to prevent the generation of a false alarm by such conventional explosion, a modification is contemplated according to a further embodiment of the present invention. As described, for conventional explosions, the time difference between the light signal and the electromagnetic signal is only in the order of one microsecond or thereabout. However, in the case of nuclear explosions the delay between the electromagnetic signal and the light signal is usually substantially greater than one microsecond.

To provide a disturbance free apparatus for detecting nuclear explosions, the invention presently contemplates the use of a detector such as generally designated by the reference numeral 10. The detector 10 includes an antenna 1 (first receiving means) for receiving said electromagnetic signals and converting the latter into electrical signals constituting received electromagnetic signals. A receiver amplifier 2 is connected to the antenna 1 for amplifying the signals so converted by the antenna to a level sufficient to be monitored in a way to be described.

A light sensing element 3, such as a photodiode (second receiving means) is provided for receiving said light signals and converting the latter into corresponding electrical signals constituting received light signals. A receiver amplifier 4 is provided for amplifying said received light signals to a level sufficient to be monitored in a manner to be described. Antenna 1 receives the electromagnetic radiation from both nuclear explosions and lightning. Similarly, photodiode 3 responds both to light from nuclear explosions and light from lightning.

Receiver amplifier 4 is so designed that it reacts only to the slope of the leading edge of the light siganl. This will be described in greater detail with reference to FIG. 3.

Receiver amplifiers 2 and 4 each have an output connected to a coincidence stage 5. As will be described in greater detail with reference to FIG. 3, the operation of coincidence stage 5 is such that a signal *7a* appears at its output for a predetermined time interval starting several microseconds after receipt of an electromagnetic signal and lasting for several milliseconds after said start, but only in the absence of a light signal received during the abovementioned several microseconds. Signal *7a* does not appear if a light signal is received within several microseconds of the electromagnetic signal. Signal *7a* constitutes the control signal.

This control signal is used for gating of stage 6 which is an AND-gate whose first input is connected to receive the above-mentioned control signal, while its second input is connected to the output of the second receiver means. AND-gate 6 thus furnishes an output (the alarm signal) if a light signal is received during the duration of the control signal. The alarm signal is thus not generated when a light signal is received substantially simultaneously (within several microseconds) of the electromagnetic signal, thereby preventing false alarms. A further stage 8 which is connected to the output of stage 6 denotes any device which should be activated in the event of the occurrence of a nuclear explosion. Thus it might denote an alarm, an indicating device to record that a nuclear explosion is taking, or has taken place, or the closing of an observation telescope.

Figure 3:
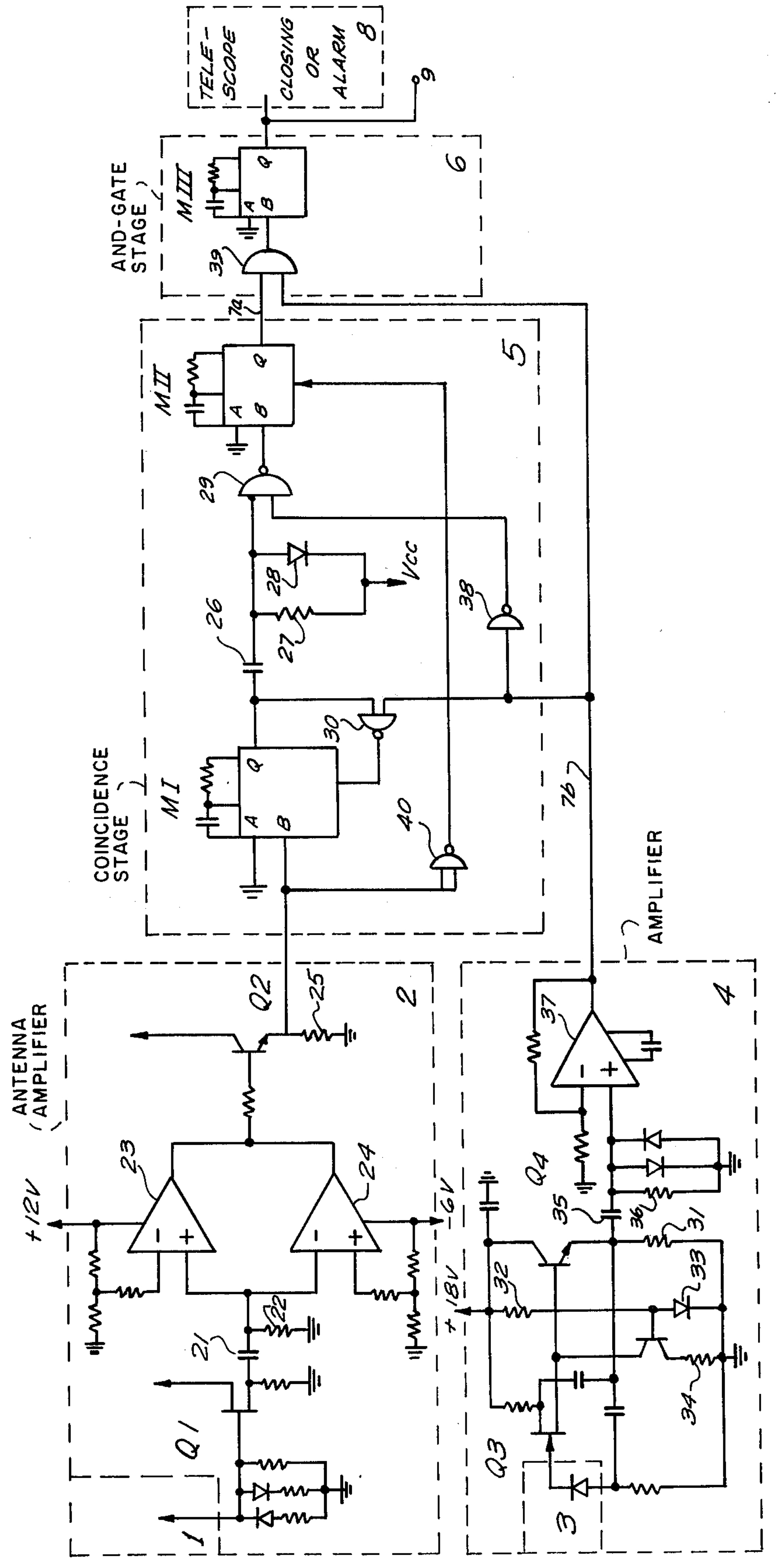
FIG. 3 is a circuit diagram of the detector of FIG. 2.

FIG. 3 shows the circuit diagram of the present invention. The antenna 1 receives the electromagnetic signal and, after amplitude limitation by two diode-resistor circuits connected in parallel with opposite polarity, the signal is applied to the base of a field effect transistor. The output of the field effect transistor is differentiated by means of a differentiating circuit including a capacitor 21 and a resistor 22. The output of the differentiating circuit is connected to the input of a dual differential comparator. This dual differential comparator comprises a first differential amplifier 23 and a second differential amplifier 24. The output of the differentiating circuit is connected to the positive input of differential amplifier 23 and the negative input of differential amplifier 24. The outputs of differential amplifiers 23 and 24 are connected in common to the base of a transistor Q2 which is an npn transistor connected as an emitter-follower having an emitter resistor 25. The output of emitter-follower Q2 is connected to the B input of a first monostable multivibrator MI. A signal applied at the B input of monostable multivibrator M1 causes a positive signal to appear at its output Q. Connected to the output Q is a differentiating circuit including a capacitor 26 and a resistor 27. A diode 28 is connected in parallel with resistor 27. The common point of resistor 27 and capacitor 26 is connected to the first input of an AND-gate 29. The first input is an inverting input. The negative going signal which appears when multivibrator MI is switched from the positive output at terminal Q to a zero output at terminal Q thus passes AND-gate 29 if a signal is present at the other terminal of this AND-gate. This other signal will be discussed further below.

The Q output of multivibrator MI is also applied to the first input of an AND-gate 30 the energization of whose second input will also be discussed below. The output of AND-gate 30 is connected to a reset input of multivibrator MI. The output of AND-gate 29 is connected to the B input of a multivibrator MII. Again, a signal appears at the Q output of multivibrator MII upon application of a signal to its B input. The signal at the output of multivibrator MII is labelled *7a* in FIG. 3 and constitutes the control signal.

The second receiving means 4 comprise a photodiode 3. The signal furnished by photodiode 3 is amplified by application to the base of a field effect transistor Q3. The output of field effect transistor Q3 is connected to the base of a transistor Q4. Transistor Q4 is also connected as an emitter follower and has a emitter resistor 31. A transistor Q5 serves as a load to field effect transistor Q3. It acts as a constant current source and has its base connected to a voltage divider comprising a resistor 32 connected in series with a diode 33, while its emitter-collector circuit connects one base of field effect transistor Q3 to ground potential through a resistor 34. A differentiating circuit comprising a capacitor 35 connected to a resistor 36 is connected to the emitter of transistor Q4. The output of the differentiating circuit is connected to the direct input of a differential amplifier 37. Further, feedback capacitors C2 and C1 are provided for field effect transistor Q3 to compensate for its input capacitance, thereby allowing small rise time for the output of receiver 4 in response to an input light pulse on photodiode 3. The output of the above-mentioned differential amplifier 37 constitutes the received light signal and is labelled *7b* in FIG. 3.

Signal *7b* is applied directly to the second input of the above-mentioned AND-gate 30 and, through an inverter 38 to the second input of the above-mentioned AND-gate 29.

Signals *7a* and *7b* are applied respectively to the first and second input of an AND-gate 39 which forms part of a stage 6. The output of AND-gate 39 is applied to the B input of a third monostable multivibrator MIII. The resulting signal at the Q output of multivibrator MIII causes the activation of a stage 8 which, in a preferred embodiment of the present invention is the closing of the observation telescope or the setting of an alarm. Further, the signal is also applied to a terminal 9 which indicates that other instruments such as recorders, may be activated simultaneously with the equipment in stage 8.

The above-described circuit operates as follows:

An electromagnetic signal received at antenna 1 is differentiated by the differentiating circuit including capacitor 21 and resistor 22. After further amplification the signal is applied to the B input of multivibrator MI which is a monostable multivibrator and furnishes a positive output at terminal Q which lasts for a specific number of microseconds following receipt of the signal at terminal B. In a preferred embodiment of the present invention the signal is furnished at the Q output for a period of 3 microseconds. Let it now be assumed that within the three microseconds a light signal is received by photodiodes 3. The resultant signal after amplification is differentiated in the differentiating circuit including capacitor 35 and resistor 36 and after further amplification appears on line *7b* as a positive pulse. This pulse is applied to the second input of AND-gate 30. Since it was assumed that the light pulse was received within three microseconds after the electromagnetic pulse, an output appears at the output of gate 30 which causes multivibrator MI to switch back to the original state wherein no signal is furnished at the Q terminal. This transition at the Q terminal is differentiated by capacitor 26 and resistor 27. Diode 28 serves to block the positive going differentiator signal resulting from the transition at the Q output from a zero to a positive output. The signal resulting from the negative going transition of Q which results from the application of the signal *7b* is, however, not suppressed but applied to the inverting input of AND-gate 29. This signal would pass AND-gate 29 if a positive signal simultaneously appeared at its second input. However, because of inverter 38, the signal present at the second input of AND-gate 29 when signal *7b* is present is a negative signal. Thus the pulse appearing at its first input, while a signal is also present on line *7b*, is suppressed. Any further action of the circuit will thus be inhibited.

Now let it be assumed that a signal is received by photodiode 3 and thus at the output of the second receiving means, namely on line *7b*, following the receipt of the electromagnetic signal by more than several microseconds. Under these conditions monostable multivibrator Mi has switched back after the expiration of its time constant, that is after 3 microseconds. This signal is again differentiated as mentioned above and applied to the inverting input of AND-gate 29. Under these conditions, however, a positive signal appears at the output of AND-gate 29 since no signal is then present on line *7b*. Thus AND-gate 29 furnishes an output which is used to set a multivibrator MII, which is also a monostable multivibrator, to the state wherein it furnishes a positive output at terminal Q. In the absence of a reset signal, the multivibrator MII is so designed that the signal at terminal Q is maintained for several milliseconds. Control signal *7a*, which is the signal at the Q output of multivibrator MII is the control signal. It is applied to the first input of an AND-gate 39 which forms the input to stage 6. The second input of AND-gate 39 is connected to line *7b*. As was stated above the signal is maintained on line *7a* for a time which starts three microseconds after receipt of the electromagnetic signal and is then maintained for several milliseconds. Any light signal received during this time, that is any signal furnished on line *7b* thus results in an output of AND-gate 39. The output of AND-gate 39 is applied to a monostable multivibrator MIII. The time constant of this monostable multivibrator may be any time constant which is required to effect either the closing of a telescope, the generation of an alarm, or the activation of a recorder. Thus while the signal at the output of AND-gate 39 is the basic alarm signal, this alarm signal can be extended for the required time period by use of monostable multivibrator MIII. Monostable multivibrator MIII thus constitutes means for extending the alarm signal.

It should further be noted that an AND-gate 40 is provided both of whose inputs are connected to the output of the first receiver means 2. The output of this AND-gate is used to reset monostable multivibrator MII. This multivibrator is thus reset if a further electromagnetic signal is received within 3 milliseconds of reception of the first electromagnetic wave signal. Thus if a further electromagnetic signal is received prior to the reception of the light signal, the operation of the circuit is also inhibited.

While the invention has been illustrated and described as using particular types of circuits for generating and inhibiting nuclear alarms under predetermined conditions, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations dhould and are intended to be comprehended within the meaning and range of equivalence of the following claims.

What is claimed as new and desired to be protected by Letters Patent is set forth in the appended:

1. An apparatus for detecting nuclear explosions with a false alarm prevention feature, the apparatus, comprising, in combination, first receiving means for detecting electromagnetic radiation having frequencies outside the visible range and of the type generated from a nuclear explosion; second receiving means for detecting visible light of the type generated from a nuclear explosion; control circuit means connected to said first and second receiving means for generating a control signal if the visible light detected by said second receiving means follows the electromagnetic radiation detected by said first receiving means by a time interval less than approximately 3 milliseconds; inhibit means connected to said control circuit means and to said first and second receiving means and operative for inhibiting the generation of said control signal if the visible light detected by said second receiving means follows the electromagnetic radiation detected by said first receiving means by a time interval less than approximately 3 microseconds; and output means operative for generating an alarm signal in response to generation of said control signal.

2. An apparatus for detecting nuclear explosions with a false alarm prevention feature, the apparatus, comprising, in combination, first receiving means for detecting electromagnetic radiation having frequencies outside the visible range and of the type generated from a nuclear explosion; second receiving means for detecting visible light of the type generated from a nuclear explosion; control circuit means connected to said first and second receiving means for generating a control signal if the visible light detected by said second receiving means follows the electromagnetic radiation detected by said first receiving means by a time interval less than a predetermined time interval having a predetermined duration; inhibit means connected to said control circuit means and to said first and second receiving means and operative for inhibiting the generation of said control signal if the visible light detected by said second receiving means follows the electromagnetic radiation detected by said first receiving means by a time interval less than approximately 3 microseconds, 3 microseconds constituting a predetermined minimum time delay; and output means operative for generating an alarm signal in response to generation of said control signal.

3. Equipment as set forth in claim 2, wherein said control circuit means comprise control monostable multivibrator means responsive to a set signal and having a time constant corresponding to said predetermined time duration; time delay means having an input connected to said first receiving means and an output connected to said control monostable multivibrator means, for furnishing said set signal in response to a received electromagnetic signal but at said predetermined minimum time delay thereafter; and wherein said inhibit means comprise means for inhibiting the generation of said set signal in response to a received light signal.

4. Equipment as set forth in claim 3, wherein said time delay means comprise further monostable multivibrator means having an input connected to said first receiving means and having an output, differentiating circuit means connected to said output of said further monostable multivibrator means, and a first AND-gate having a first input connected to said differentiating circuit means, a second input connected to said inhibit means and an AND-gate output connected to said input of said control monostable multivibrator means.

5. Equipment as set forth in claim 4, wherein said inhibit means comprise a second AND-gate having a first input connected to said output of said further monostable multivibrator means and a second input connected to said second receiving means and an AND-gate output connected to said further monostable multivibrator means for resetting said further monostable multivibrator means; and wherein said inhibit means further comprise an inverter having an input connected to said second receiving means and an output connected to said second input of said first AND-gate.

6. An arrangement as set forth in claim 2, wherein said output means comprise an AND-gate having a first input connected to said control output, a second input connected to said second receiving means and an AND-gate output for furnishing an alarm signal.

7. Equipment as set forth in claim 6, further comprising means connected to said AND-gate output for extending said alarm signal.

8. Equipment as set forth in claim 7, wherein said means for extending said alarm signal comprise an additional monostable multivibrator having an input connected to said AND-gate output and an output for furnishing an extended alarm signal.

9. Equipment as set forth in claim 8, further comprising a telescope; and means for closing a shutter of said telescope in response to said extended alarm signal.

* * * * *